May 5, 1925. 1,536,390
R. R. DOWNIE
SKIMMER SCOOP ASSEMBLY
Filed June 27, 1921 2 Sheets-Sheet 2
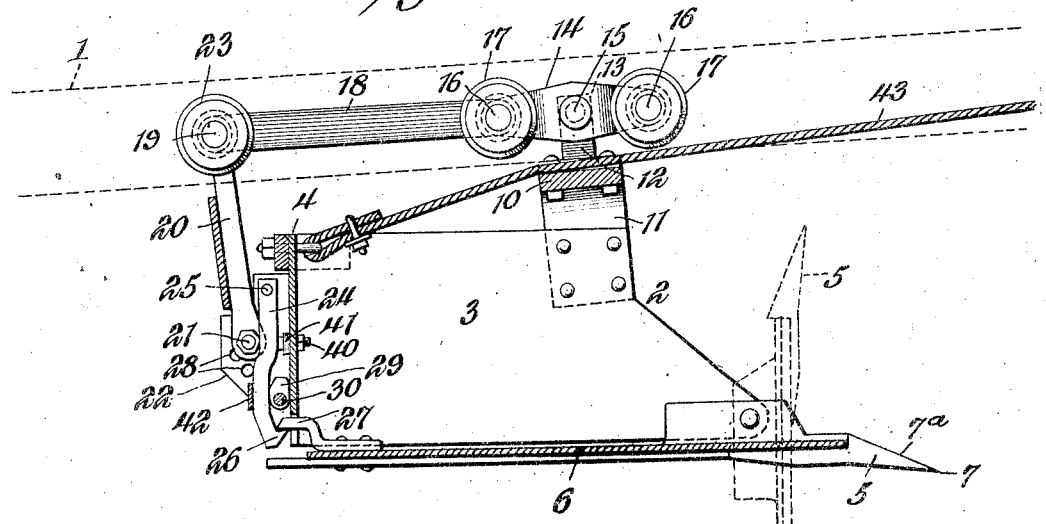
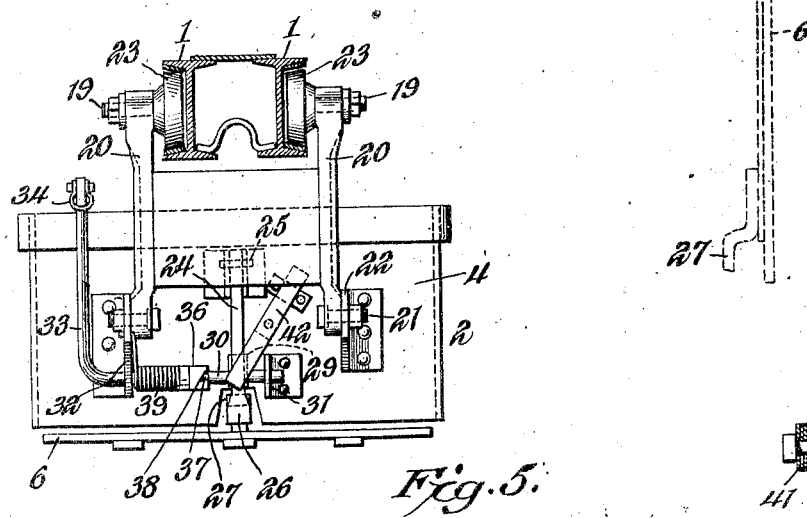
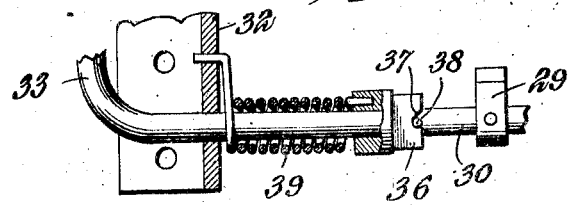
R. R. Downie,
INVENTOR, Patented May 5, 1925.

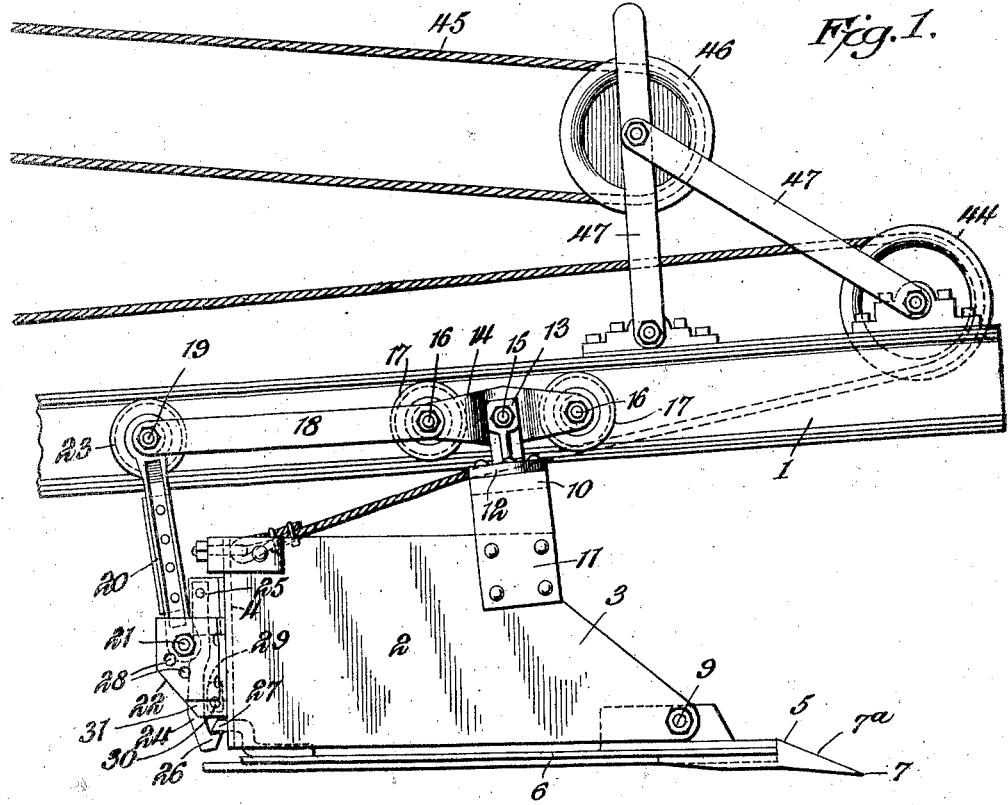
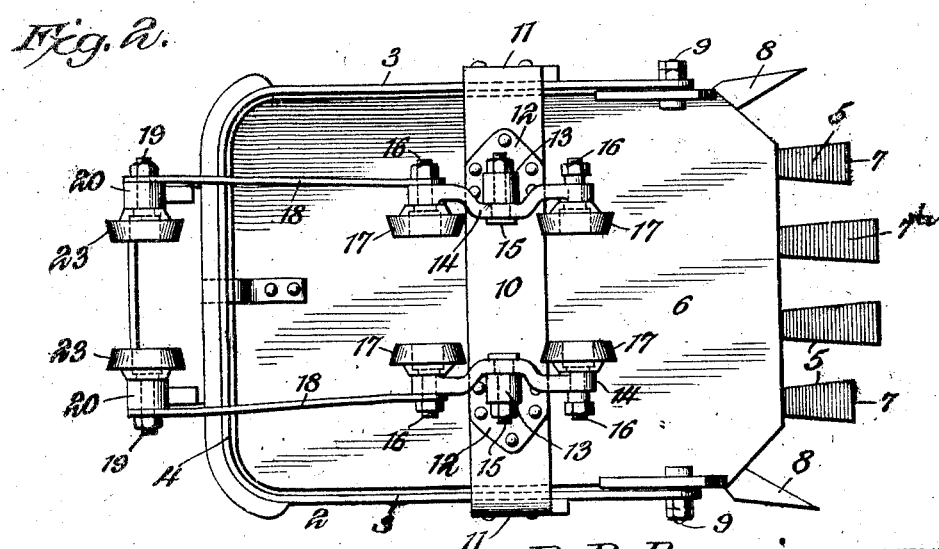

1,536,390

UNITED STATES PATENT OFFICE.

ROBERT REX DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA.

SKIMMER-SCOOP ASSEMBLY.

Application filed June 27, 1921. Serial No. 480,717.

*To all whom it may concern:*

Be it known that I, ROBERT R. DOWNIE, a citizen of the United States, residing at Beaver Falls, in the county of Beaver and State of Pennsylvania, have invented new and useful Improvements in Skimmer-Scoop Assemblies, of which the following is a specification.

This invention has reference to excavating machine scoop assemblies of the type known as skimmer scoops, wherein the scoop body is sustained by bails or hangers upon a boom, along which the scoop travels, one of the bails or hangers being forward of the other in the direction of travel of the scoop. One improvement consists in arranging or locating the more forward bail or hanger above a point at or about midway of the length of the scoop. This is because the digging edge of the scoop must project a distance beyond the end of the boom, when the forward rollers used to sustain the scoop on the boom, have reached the forward limit of their travel, in order that the scoop may, at each thrust, take up material to and beyond the end of the boom, which material would otherwise interfere with the lowering of the boom for the next thrust of the scoop. Moreover, the front bail must comprise a crosswise part immediately beneath the boom, and since such part necessarily interferes to some extent with the passage of material, the bail should be placed as far toward the rear as possible in order that it may interfere to only a minimum extent with the total amount of material taken into the scoop while at the same time providing ample support.

In this median position the front bail is subjected to a particularly great strain in both instances, that is, when the mere weight of the scoop and load is supported by the boom almost the entire weight falls upon the front bail, and when, in the operation of digging, the scoop, at some point in its forward travel strikes an obstacle too hard or too tough to be cut through by the teeth of the scoop and too solidly embedded to be dislodged by a straight or horizontal crowding thereof by the scoop, it becomes necessary to exert a lifting force upon the obstacle to uproot it. In such case the upward vertical strain exerted by the teeth equals the upward strain on the rear hangers and the sum of these equals the downward strain upon the front bail. It is apparent that the front bail never receives less than about twice the strain exerted on the rear hanger, and if the strain transmitted to the front bail were delivered to the boom at one point only of its length, it would require boom members of twice the flange strength and somewhat greater bending strength than would be necessary if the strain were distributed and delivered at two points spaced apart.

To insure economy in the weight of the boom members the invention contemplates the use of an equalizing carrier whereby the strain transmitted by the front bail is delivered to the carrier through a bolt on which the carrier is supported equidistantly from its ends and is free to rock, the strain being distributed evenly to the front and rear rollers provided on the carrier.

The invention also contemplates a lead adjustment to direct the cutting edge of the scoop so that it will enter and divide the material at a predetermined plane. In the excavation of hard material, that which is loosened by the teeth and broken up thereby furnishes less resistance to the upper surface of the teeth than the compact and undisturbed material beneath the teeth furnishes to the lower surface of the teeth. There is, therefore, a tendency to deflect the cutting edge upwardly from its true or desired plane of travel. As an offset to this tendency the scoop is given a lead or downward tilt with respect to its line of travel. These tendencies vary with the sharpness or dullness of the teeth and the resistance to penetrability of the material upon which the teeth act, and they also vary from time to time and in accordance with the degree of lead, so that with the lead constant the scoop might be inefficient at one time and cut too deeply at another time.

In the present invention, the adjustments for lead are made at a point of the scoop which receives a minimum strain, resulting in durability of the parts as well as ease of manipulation.

The invention will be best understood from a consideration of the following detailed description taken in connection with the accompanying drawings, forming part of this specification, with the understanding, however, that the invention is not confined to any strict conformity with the showing of the drawings, but may be changed and modified, so long as such changes and modifications mark no material departure from the salient features of the invention, as expressed in the appended claims.

In the drawings:

Fig. 1 is a side elevation of a skimmer scoop constructed and supported in accordance with the invention.

Fig. 2 is a plan view of the scoop, but omitting the boom.

Fig. 3 is a longitudinal vertical section of the skimmer scoop, showing the boom in dotted lines, and also showing the bottom of the scoop in dotted lines in open position.

Fig. 4 is a rear elevation of the scoop, with the boom in cross section.

Fig. 5 is a detail section of a portion of the latch structure for the bottom of the scoop.

Fig. 6 is a detail section of an adjustable stop device employed in the scoop.

Referring to the drawings, there is shown a boom 1, preferably of the double channel type common in excavating machines consisting of two I-beams connected together, the outer flanges of the beams forming tracks (Fig. 4). There is also shown a scoop 2, of the construction known as a skimmer scoop, because of the fact that the scoop is so made that it may be drawn along a surface and excavate to relatively small depth at each stroke, say from 3 to 8 inches in depth with the scoop traveling approximately parallel with the ground and entering only far enough into the ground to gather a load, the operation being known as skimming.

The scoop 2 comprises sides 3, and a back 4 rising to a suitable height and usually in one piece with the sides, while the front end of the scoop is open and is provided with digging teeth 5, appropriately shaped for the purpose. Ordinarily the teeth 5 are attached to the under face of the bottom of the scoop, which bottom is indicated at 6, and the teeth are widened toward their front or earth-entering ends, and are brought to a sharp edge or point 7, and furthermore, have a tapering top face 7ª. At the mouth of the scoop are side shearing teeth 8 protecting hinge bolts 9 by means of which the bottom 6 is hinged to the sides 3 of the scoop at the mouth end thereof. This produces a hinged bottom with the axis of hinging near the mouth of the scoop and the teeth 5 projecting beyond the mouth of the scoop. When the bottom swings downwardly on its pivot, the teeth at the front project upwardly as shown in Figure 3.

Joining the sides 3, about midway of the length of the scoop and above the sides, is a bail 10, having drop ends 11 riveted or otherwise secured to the sides of the scoop, and between its ends carrying brackets, also riveted or otherwise secured to the bail. Each bracket is formed with a hub 13, to which there is secured a rocker arm 14, by means of a bolt 15, or other appropriate attaching device, which may also serve as a pivot. At opposite ends of each rocker arm there are secured journal bolts 16, each carrying a roller 17, adapted to move along and in a respective channel in the boom 1. The rocker arms may be termed as carriers for the pairs of rollers.

The rear end of each rocker arm 14 is connected by the bolt 16 to one end of a link 18 extending beyond the back of the scoop and each link is connected by a pivot bolt 19 to the upper end of a hanger 20, the lower end of each of which is pivoted by a bolt 21, to a respective bracket 22, said brackets being spaced apart and made fast to the rear end of the scoop 2. Each bolt 19 carries a roller 23, similar to and in longitudinal alinement with the rollers 17 on the same side of the boom. By this arrangement there are provided three rollers disposed in longitudinal alinement and in engagement with the outer flanges of the boom at opposite sides.

At the back of the scoop a latch 24 is pendantly hung from a pivot pin 25, and the lower end of the latch 24 is formed with a tooth 26 to be engaged by a keeper 27 fast on the rear end of the scoop bottom 6. The bracket 22 has a series of holes 28 through any one of which the bolt 21 may be passed for the purpose of adjusting the lead or downward slant of the scoop.

The latch lever 24 is controlled by a cam 29, mounted on a shaft 30, with which it is constrained to move. The shaft 30 is journaled at one end in a bracket 31 fast to the back of the scoop and continued through another bracket 32 beyond which the shaft is bent so as to rise, forming an arm, as shown at 33, to a high point at the back of the scoop where it receives a link or eye 34, carried to a point of control which may be on or to one side of the excavating machine carrying boom 1. The shaft 30 carries a loose collar 36, having a notch 37 therein to receive a pin 38 on the shaft 30, while a spring 39 is wound about the shaft 30, yieldingly holding the collar 36 against the pin 38, whereby a pull on the eye 34 in one direction will cause the cam 29 to rotate to release the latch keeper 26 and will permit the return of the cam to its first position when the pull on the eye 34 is ceased.

The spring 39 exerts a torsional strain upon the shaft 30 maintaining the cam and arm normally in upright position. Also there is a slight compression strain in the spring 39 which keeps the collar 36 engaged with the pin 38. The collar fits the shaft loosely and being preferably hexagonal in form it may be turned by a wrench. It has a pair of notches 37, each notch having one square shoulder and one sloping shoulder so that when the collar is turned in a direction to tighten the spring 39 the collar automatically disengages itself, compressing the spring until the collar is turned one-fourth revolution, at which point the other pair of notches come into engagement.

In the path of the latch lever 24 is a stop pin 40, carried by the back of the scoop and provided with a series of removable washers 41, whereby the projection of the stop 40 may be controlled at will. (Fig. 6). A leaf spring 42 is carried by the back of the scoop in position to bear upon the latch arm 24, and thus yieldingly hold it toward engaging relation to the keeper 27. The latch 24 being hung from the pin 25 contacts with the stop, which is made adjustable, as before stated, in order to adjust the extent of engagement of the latch with the keeper.

In order to actuate the scoop along the boom, a line 43 is connected to the back 4 of the scoop and carried forwardly to the front end of the boom 1, where it is directed backwardly about a sheave 44 on the boom and may proceed from thence to a winding drum on the excavating machine (not shown).

When the skimmer scoop is installed, the hangers 20 are adjusted to permit the rear end of the scoop to be raised or dropped about the pivot bolts 15, thus correspondingly varying the lead of the equalizing roll carriers and the angle at which the teeth 5 are presented to the earth to be engaged. With the foremost one of the two bails or hangers carrying the scoop located above a point about midway of the length of the scoop, the angle at which the teeth 5 engage the dirt is established, but may be changed from time to time about the pivot bolts 15 by engaging the bolts 21 in some one of the holes 28. This is a light and simple operation, as the scoop is nearly balanced upon the pivot bolts 15, and the bolts 21 do not require a snug fit, since a small amount of play is not objectionable at a point so far removed from the main pivot support of the scoop. The forward roll carriers being mounted as shown in Figure 1, the digging edge of the scoop will project a distance beyond the outer end of the boom at the forward limit of its travel, thus causing the scoop to take up at each thrust material beyond the end of the boom, for otherwise such material would interfere with the lowering of the boom for the next thrust of the scoop. This also permits as little interference as possible by the total amount of material taken into the scoop. In practice the scoop is given a lead or downward tilt with respect to its line of travel.

In order to raise and lower the boom, a hoisting line 45 coming from the excavating machine is provided and this line is carried abut a sheave 46 mounted in supports 47 carried by the boom.

In this style of scoop, the bottom is not closed positively but by a quick movement of the scoop body which causes the bottom to swing up about its axis 9 with a pendulum-like motion. The latch must be very quick acting in order to secure the bottom before it can rebound from its closed position. The use of the cam release permits the latch to move independently of and unhampered by the releasing mechanism.

A pull upon the dump rope attached to the link 34 overcomes the pressure of springs 39 and 42, oscillates the cam 39 forcing the latch 24 to swing outwardly upon its pivot 25, disengaging the latch keeper 26 so that the bottom of the scoop swings downwardly discharging the material. The dump rope is then slackened and the action of springs 39 and 42 bring the arm, cam and latch to their normal vertical positions. By a quick shifting of the position of the scoop, the bottom is made to swing upwardly automatically engaging the latch and closing the scoop.

No claim is made herein for the latch releasing mechanism, as it has been made the subject of a divisional application which has eventuated in Patent No. 1,511,114, dated October 7, 1924.

What is claimed is:—

1. In an excavating machine, a boom, a scoop, and carrying means for the scoop adapted to move along the boom and comprising a plurality of connected carrying rollers, additional rollers spaced from and connected to the first named rollers and associated with the boom, all of said rollers being arranged in two rows, with the rollers of each row in the same longitudinal alinement and engaging respectively opposite sides of the boom, and a pivotal connection between the forward part of the scoop and the connected carrying rollers.

2. In an excavating machine, a boom, a scoop, and carrying means for the scoop adapted to move along the boom and comprising a plurality of connected carrying rollers, additional rollers spaced from and connected to the first named rollers and associated with the boom, all of said rollers being arranged in two rows on respectively opposite sides of the boom, a pivotal connection between the forward part of the scoop and the connected carrying rollers, and an adjustable means connecting the rear end of the scoop to the said additional rollers.

3. In an excavating machine, a boom, a skimmer scoop supported by and movable lengthwise of the boom, and carrying rollers for the scoop on opposite sides of and engaging the boom, certain of the rollers being connected in two pairs on opposite sides of the mid-length of the scoop, and other rollers spaced from and connected by links to the pairs of rollers and more distant from the front end of the scoop than the pairs of rollers, and movable on the boom substantially above the rear end of the scoop and connected thereto, the latter hanging at the rear from the said other rollers.

4. In an excavating machine, a boom, a skimmer scoop supported by and movable lengthwise of the boom, and carrying rollers for the scoop on opposite sides of and engaging the boom, certain of the rollers being arranged in two pairs on opposite sides of the mid-length of the scoop, and other rollers connected by links to the pairs of rollers and more distant from the front end of the scoop than the pairs of rollers, said other rollers being connected to the rear of the scoop, each pair of rollers having a rockable carrier arranged lengthwise of the travel of the scoop along the boom.

5. In an excavating machine, a boom of the double channel type, a skimmer scoop associated with the boom to move therealong, a bail extending crosswise of the scoop substantially midway of the length of the scoop, a pair of rollers and a rockable carrier therefor on each side of the boom and sustained thereby, a connection between the bail and the carrier, and a third roller on each side of and sustained by the boom and located to the rear of the first-named rollers all of said rollers engaging within the channels of said boom and joined together to move as a unit.

6. In an excavating machine, a boom, a skimmer scoop adapted to travel along the boom, a bail connected to and extending crosswise of the scoop substantially midway of the length thereof, a pair of rollers on each side of the boom and sustained thereby, a carrier for the rollers, a pivotal support between each carrier and the bail, another roller on each side of and sustained by the boom and located to the rear of the carrier, and means directly connecting the last-mentioned roller to the carrier in the horizontal plane of the latter.

7. In an excavating machine, a boom, a skimmer scoop adapted to travel along the boom, a bail extending crosswise of the scoop substantially midway of the length thereof, a pair of rollers on each side of the boom and sustained thereby, a carrier for the rollers, a pivotal support between each carrier and the bail, another roller on each side of and sustained by the boom and located to the rear of the carrier, means directly connecting the rear roller to the carrier, and a hanger between the rear roller and the rear portion of the scoop.

8. In an excavating machine, a boom, a skimmer scoop associated with the boom to move therealong, a bail extending crosswise of the scoop substantially midway of the length of the scoop, a pair of rollers and a rockable carrier therefor on each side of the boom and sustained thereby, a connection between the carrier and the bail and a third roller on each side of and sustained by the boom and located to the rear of the first-named rollers, and a link connection between each pair of rollers and the single roller to the rear thereof.

9. In an excavating machine, a boom, a skimmer scoop adapted to travel along the boom, a bail extending crosswise of the scoop substantially midway of the length thereof, a pair of rollers on each side of the boom and sustained thereby, a carrier for the rollers, a pivotal support between each carrier and the bail, another roller to the rear of the carrier, a link connecting each carrier and said other roller to the rear thereof, and a hanger between each of the rearmost rollers and the rear portion of the scoop.

10. In an excavating machine, a boom, a skimmer scoop adapted to travel along the boom, a bail extending crosswise of the scoop substantially midway of the length thereof, a pair of rollers on each side of the boom and sustained thereby, a carrier for each pair of rollers, a pivotal support between each carrier and the bail, another roller to the rear of each carrier, means connecting the rear roller to the carrier, a hanger between each of the rearmost rollers and the rear portion of the scoop, and adjustable connections between each hanger and the rearmost portion of the scoop, whereby the lead of the forward end of the scoop may be changed.

11. In an excavating machine, the combination of a boom, a scoop, rollers supported by and movable lengthwise of the boom, certain of the rollers being arranged and connected in pairs on opposite sides of the boom, means for pivotally connecting said rollers to the scoop in advance of the rear end of the latter, and other rollers arranged singly at each side and flexibly connected to each pair and adjustably connected to the rear end of the scoop, all of said rollers having connection with the scoop so that the scoop hangs from the rollers at each side.

12. In an excavating machine, a boom, a skimmer scoop adapted to travel along the boom, a bail extending crosswise of the scoop substantially midway of the length thereof, a pair of rollers on each side of the boom and sustained thereby, a carrier for each pair of rollers, a pivotal support between each carrier and the bail, another roller to the rear of each carrier, a link connecting each carrier and said other roller to the rear of the carrier, a hanger between each of the rearmost rollers and the rear portion of the scoop, and adjustable connections between each hanger and the rearmost portion of the scoop, whereby the lead of the forward end of the scoop may be changed.

13. In an excavating machine, a channel boom, a scoop supported by and movable lengthwise of the boom, and six carrying rollers for the scoop, three on each side of and running in the channels of the boom, two of the rollers on each side being connected by a carrier, and the third roller on each side being each flexibly connected to each of said carriers, hanging means connecting the third pair of rollers with the rear of the scoop, and an independent hanging means connecting the carriers to the scoop forwardly of the rear connection.

14. In an excavating machine, a boom, a scoop supported by and movable lengthwise of the boom, and six carrying rollers for suspending the scoop from the boom, three on each side of and engaging the boom, means for connecting a pair of the rollers on each side, hanging means pivotally connected to said connecting means between the individual rollers of each pair, said hanging means being secured to the scoop, flexible connections between said connecting means and the third pair of rollers, and a rear hanging means connecting the third pair of rollers with the rear end of the scoop.

15. In an excavating machine, a boom, a scoop supported by and movable lengthwise of the boom, and six carrying rollers for suspending the scoop from the boom, three on each side of and engaging the boom, the rollers on each side being in substantial alinement longitudinally and the rollers on opposite sides being in substantial transverse alinement, a carrier connecting the forward pair of rollers on each side so that they move together, a hanging means connecting the forward part of the scoop to said carriers, a link connection at each side between said carriers and the third roller, hanging means between the third rollers and the rear end of the scoop.

16. In an excavating machine, a boom, a scoop supported by and movable lengthwise of the boom, and six carrying rollers for suspending the scoop from the boom, three on each side of and engaging the boom, two of the rollers on each side being connected by a carrier, and the third roller on each side being each flexibly connected to each of said carriers, hanging means connecting the third pair of rollers with the rear of the scoop, and an independent hanging means pivoted to each carrier between the rollers, and rigidly connected to the scoop forwardly of the rear connection of the rear hanging means.

17. In an excavating machine, a boom, a scoop supported by and movable lengthwise of the boom, and six carrying rollers for suspending the scoop from the boom, three on each side of and engaging the boom, the rollers on each side being in substantial alinement longitudinally and the rollers on opposite sides being in substantial transverse alinement, a carrier connecting the forward pair of rollers on each side so that they move together, a hanging means rigidly connected to the forward part of the scoop and pivotally connected to said carriers, a link connection at each side between said carriers and the third roller, and other hanging means between the third rollers and the rear end of the scoop, said hanging means for the third rollers being adjustably connected to the scoop, whereby the lead or slant of the scoop may be adjusted, the scoop turning on the forward pivotal connection provided between the forward hanging means and said carriers.

18. In an excavating machine, a boom, a skimmer scoop provided with a dumping bottom pivoted to the scoop on a transverse axis adjacent to the forward end of the scoop and there provided with earth-entering teeth, means travelling along the boom and connected to the scoop at the rear and also forwardly thereof, the rear connection being vertically adjustable and the forward connection including a pivot upon which the scoop turns, whereby the lead or downward tilt of the scoop may be adjusted.

19. In an excavating machine, a boom, a skimmer scoop, a bail extending crosswise of the scoop substantially midway of the length thereof, means travelling lengthwise on the boom, pivotal means connecting the bail to said travelling means, and a hanger also connected with said travelling means and adjustably connected with the rear portion of the scoop, whereby the scoop may be tilted downwardly on its pivot and held in such position by the adjustment of the said hanger.

20. In an excavating machine, a skimmer scoop provided with a dumping bottom, a boom carrying and guiding the scoop, means traveling along the boom, rockable sustaining means for the mid-portion of the scoop, and up-and-down adjustable means for the rear end of the scoop, said rockable means and said adjustable means being connected to said traveling means.

21. In an excavating machine, a boom of the double channel type, a scoop having a dumping bottom pivoted to the forward end of the scoop and there provided with earth-entering teeth, and six carrying rollers for suspending the scoop from the boom, three rollers on each side and running in the channels of the boom, all of said rollers being connected to move as a unit along the boom, a pair of the rollers at each side being connected to the scoop forward of the rear end of the scoop but in rear of the pivot of the dumping bottom, while the third roller at each side is connected to the rear of the scoop.

In testimony, that I claim the foregoing as my own, I have hereto affixed my signature.

ROBERT REX DOWNIE.